Jan. 28, 1958  E. G. CHILTON ET AL  2,821,205
METHOD AND APPARATUS FOR LUBRICATING PIPE LINES
Filed Oct. 31, 1952

Inventors:
Ernest G. Chilton
Lauren R. Handley
By A. H. McCarthy
Their Agent

United States Patent Office 2,821,205
Patented Jan. 28, 1958

2,821,205

METHOD AND APPARATUS FOR LUBRICATING PIPE LINES

Ernest G. Chilton, Berkeley, and Lauren R. Handley, Richmond, Calif., assignors to Shell Development Company, Emeryville, Calif., a corporation of Delaware Application October 31, 1952, Serial No. 318,004

12 Claims. (Cl. 137—13)

This invention relates to methods and apparatus for increasing the throughput capacity of a pipe line and pertains more particularly to the lubrication of pipe lines to facilitate the transportation of highly viscous crude oils therethrough.

It is known that an increase in the flow of a heavy petroleum may be realized by any one of several methods. For example, an increase in flow through a crude oil pipe line may be achieved by installing heating equipment at suitable intervals along a pipe line. Where light petroleum or condensed casing-head gas is produced in the vicinity of a heavy petroleum, it is common to admix some of the light petroleum with the heavy petroleum to reduce the viscosity of the latter thus enabling a pipe line to handle a greater amount of the heavy petroleum.

It is also known that substantial amounts of water may be introduced into a stream of viscous petroleum flowing through a pipe line to reduce the viscosity of the stream and thus facilitate the flow through the pipe line. Instead of adding substantial amounts of water to a viscous petroleum to reduce its viscosity, it is now proposed to add only minor amounts of water, say, about 1%, into a stream of a viscous petroleum so that the water forms a lubricating film between the flowing petroleum and the inner wall of a pipe line.

It is therefore an object of this invention to provide a method and means of facilitating the flow of heavy oil through a pipe line by lubricating the pipe line with another liquid of low viscosity, preferably one having a specific gravity approximately that of the heavy oil.

It has been found, however, that while water may be employed to reduce the viscosity of a heavy oil, or to lubricate it through a pipe line, water loses its beneficial qualities if the combined water and oil is run through a pump. Upon running a viscous oil and any amount of water through a pump, the water generally becomes thoroughly emulsified in the oil with the formation of a water-in-oil emulsion having a substantially higher viscosity than that of the unemulsified water and oil mixture upstream of the pump. It may be readily seen that it would not be practical to introduce water into a heavy oil being transported by pipe line over a distance sufficiently great to necessitate the use of more than one pump between the shipping and receiving terminals, since additional emulsification of the oil and water would occur at each pump with a concomitant increase in viscosity.

Therefore, it is also an object of this invention to provide means for introducing a film of water between the inner wall of a pipe line and a stream of viscous oil flowing therethrough, and for subsequently removing substantially all the water from the flowing stream before the stream enters a pump in the pipe line.

Another object of this invention is to provide means for introducing a thin aqueous film completely around the inner wall of a pipe line.

A further object of this invention is to provide a method and means for adjusting the specific gravity of a lubricating aqueous film to substantially that of the liquid that it surrounds.

Another object of the present invention is to provide a method and means for lubricating a stream of heavy oil in a pipe line so that increased flows through the pumps may be realized without any increase in pumping pressures.

These and other objects of this invention will be understood from the following description when taken with reference to the drawing, wherein.

Figure 8:
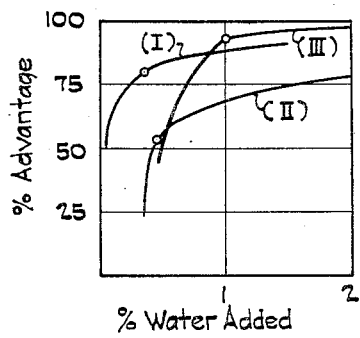

Figure 8 gives a series of curves showing the percent advantage to be obtained from lubricating films of varying thicknesses.

Figure 1:
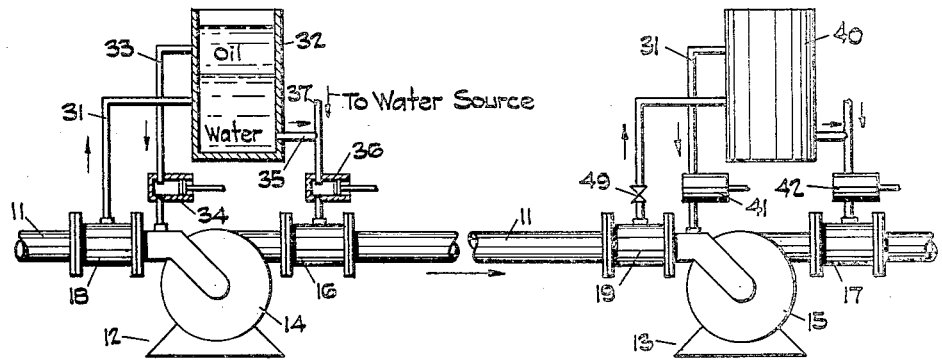
Figure 1 is a schematic diagram illustrating the principal components of a pipe line system provided with equipment for injecting a lubricating film into the pipe line according to this invention.

Referring to Figure 1 of the drawing, a pipe line system is shown as comprising a pipe line 11 running between pumping stations 12 and 13 which may be located at predetermined intervals along the line. Two pumping stations 12 and 13 are illustrated in Figure 1 as comprising pumps 14 and 15, fluid injection devices 16 and 17 in the pipe line on the downstream side of said pumps and fluid extraction or collecting devices 18 and 19 in the pipe line on the upstream side of the pumps.

Figure 2:
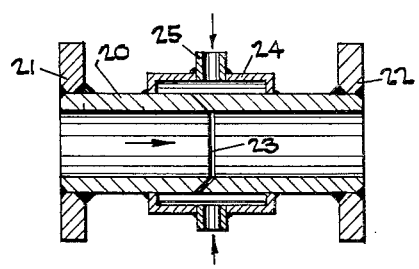
Figures 2 and 3 are cross-sectional views of one form of water injection and water extraction units employed in the system of Figure 1.
Figure 3:
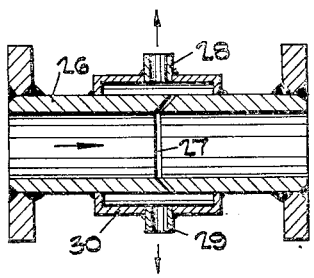

The fluid injection devices 16 and 17 and the fluid extraction devices 18 and 19 are similar and are shown in cross-sectional detail in Figures 2 and 3, respectively. The fluid injection device of Figure 2 comprises a short spool piece 20 having a diameter equal to that of the pipe line 11 (Figure 1) and flanged at the ends for connection to the pipe line.

Intermediate the flanged ends 21 and 22, the body of the spool piece 20 is slotted, as by a circumferential slot 23 which is preferably cut in the wall of the spool piece at an angle, as shown, so that a fluid being injected into the device will be injected in the direction of the flow of liquid in the pipe line. A fluidtight water jacket 24 is positioned around the body of the spool so that it covers the slot 23. The jacket may be suitably secured, as by welding, and is preferably rigid enough to support the spool piece 20 on each side of the slot 23. The jacket 24 is provided with one or more fluid ports 25 by which water may be injected into the jacket.

The fluid extraction device shown in Figure 3 is similar to the fluid injection device of Figure 2 with the circumferential slot 27 being angled downstream or against the flow, the fluid ports 28 and 29 in the jacket 30 being employed to conduct the lubricating fluid film away from the pipe line.

While the fluids extracted from the pipe line 11 by the extraction devices 18 and 19 may be run to the ground or a sump or otherwise discarded, these fluids are preferably run through a conduit 31 to a tank or separator 32 where they are separated into components. Any oil collected in the separator 32 may be run through conduit 33 by gravity or be forced by a small pump 34 into the pipe line 11 on the downstream side of said fluid extraction device 18.

If water is being used as the injection fluid for lubricating the pipe line, the water separated in the separator 32 can be fed through conduit 35 and re-injected into the pipe line 11 at the water injection device 16 positioned on the downstream side of the pump 14. Water feed may be by gravity or by an auxiliary pump 36. Also, any additional water needed as make-up water for injection at the injector device 16 may be obtained through a conduit 37 which is in communication with a suitable source of water. The equipment at each of the pumping stations is substantially identical, station 13 being shown provided with a separator 40 and injection pumps 41 and 42.

The purpose of employing the above-described equipment is to inject a thin film of low-viscosity fluid into a pipe line transporting a high-viscosity fluid, such as, for example, various grades of crude oil. In order to inject as small an amount of water as possible and yet obtain maximum lubricating efficiency, it is important that the water be injected at several points around the circumference of the pipe and preferably at all points as is possible through the use of a circumferential slot 23, as shown in Figure 2.

Figures 4, 5:
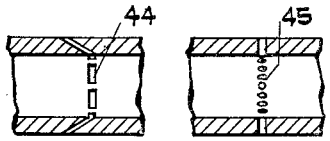
Figures 4, 5, 6 and 7 are partial detail views in cross section showing various arrangements of slots in the pipe line which may be used.
Figures 6, 7:
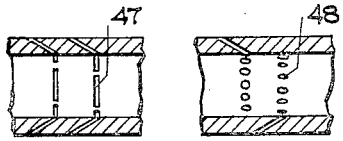

Satisfactory water injections may also be made through a circumferential row of slots 44 or holes 45, as shown in Figures 4 and 5 respectively. Adequate results may be obtained by use of as few as four holes (such as shown at 45) spaced at 90 degree intervals around the pipe when the sum of the diameters of the holes is equal to about 10% of the circumference of the pipe line. While a satisfactory water film may be formed on the interior of the pipe by the use of a few spaced injection holes, it is not possible to remove successfully the water film at one of the extraction devices 18 or 19 unless a substantially continuous slot 27 is cut through the wall of the extraction device 26 (Figure 3). Adequate results in extracting the water film could be realized by employing a plurality of closely spaced slots 44, as shown in Figure 4, but it is preferable, when using spaced slots 44 or holes 45, to employ a double line of slots 47 or holes 48 which overlap each other, as shown in Figures 6 and 7, respectively.

The width of the slots 23, 27, 44 and 47 or the diameter of the holes 45 and 48 may be of any desired dimension with the minimum width or diameter being at least about twice the thickness of the water film to be formed on the inner wall of the pipe line 11.

In the operation of the above-described system, as a heavy viscous crude oil is being pumped by pumps 14 and 15 through pipe line 11, water or any other suitable low viscosity fluid is injected by gravity or by means of a pump 36 (Figure 1) through an injection device 16 and into the pipe line 11 where it forms a thin film on the inner wall of the pipe line and acts as a film of lubricant between the flowing crude oil and the wall of the pipe. Actually, the water is fed through port 25 of the jacket 24 and flows around the jacket to enter all portions of the circumferential slot 23 at the same time. The slot width and the pressure drop across it are governed by the amount of water to be injected, with the pressure drop across the slot being maintained at a sufficiently high value so that equal amounts of water are fed into all portions of the slot at the same time. A low pressure drop across a vertical slot in a horizontal pipe line would cause the water to feed into the bottom of the slot only.

The water film formed on the inner wall of the pipe line flows along with the crude oil until it reaches the next pumping station where the fluid extraction device 19 removes the water film out slot 27 (Figure 3), into jacket 28, out through discharge conduit 31 and into the separator 40. The pressure in the jacket 28 and discharge conduit 31 is maintained at a value slightly lower than the pipe line pressure so that the water film runs out of the pipe line through slot 27.

In order to insure the removal from the pipe line of substantially all of the water that was put in at the injecting device 16, small amounts of oil are preferably allowed to flow out through the slot 27 together with the water film. When using circumferential injection and draw-off slots, it has been found that a very efficient lubricating film can be formed on the inner wall of a pipe line by injecting an amount of water equal to 1% of the oil stream in the pipe line and that all of the injected water is later removed at next downstream extraction slot by drawing off ½ to 1% of the oil stream together with the water.

In order to determine how much of an oil and water mixture must be drawn off from the pipe line, so as to remove all of the water added to form the lubricating film, several samples were collected under conditions where the rate of draw-off of liquid by the extraction unit 19 was varied. This was done by varying the adjustment of a valve 49 in the draw-off conduit to the separator tank 40. For the highest rate of flow through the valve 49, all the water that had been added was removed together with an equal amount of oil. As the rate of flow through draw-off conduit 31 decreased, the amount of water removed decreased along with the percentage of oil in the sample, as can be seen from the following table:

| Sample No. | Percent of Water in Sample of the Total Water Added | Percent of Oil in Sample Compared to the Water |
| --- | --- | --- |
| 1 | 100 | 100 |
| 2 | 99 | 50 |
| 3 | 98 | 22 |
| 4 | 79 | 8.5 |

It is desirable to extract substantially all of the water film from the pipe line before the oil is run through the next pump as the pump emulsifies the oil and water with a resultant increase in viscosity of the fluid stream. The oil and water mixture is run to the tank 40 where it rapidly separates. The oil phase in the separator can be pumped back into the pipe line either upstream or downstream of the pump 15. The water phase is run from the separator 40 and used as the injection water in the injection device 17 downstream of the pump 15.

The amount of water used to form the lubricating film on the inside of the pipe line varies depending on the flow rate through the pipe and the thickness of the lubricating film that is desired. Numerous tests were made under varying conditions, such as length and diameter of pipe, different slot patterns, addition of chemical to the water, etc. The advantage to be gained by injecting a lubricating water film around a heavy crude oil in a pipe line was compared and series of curves were plotted for the "percent advantage" realized against the amount of water added, as shown in Figure 8.

The "percent advantage" figure is an arbitrary value of the relative efficiency of the system when using a lubricating film and as compared to the normal conditions without a film. For calculations relating to the present invention, the "percent advantage" may be defined as:

$$\frac{P_1-P_2}{P_1}(100)$$

wherein: $P_1$ is the pressure drop in a pipe line while pumping a heavy oil therethrough, and $P_2$ is the pressure drop in the line when a lubricating water film is injected around the same amount of oil. Thus, in a small test line where the pressure drop for the oil alone was 7.4 p. s. i. and for the combined oil and water 1.0 p. s. i., the calculations would be as follows:

$$\frac{7.4-1}{7.4} \times 100 = 87\% \text{ advantage}$$

Referring to Figure 8 of the drawing, the curves I, II and III shown represent typical percent advantage vs. percent water curves. Curve No. I is a plot of the results observed on short test pipe line of relatively small diameter. A 50% advantage was realized when only 0.1% water has been added with the advantage rising to 83% by increasing the water addition to 0.5% of the oil being pumped in the pipe line.

Curves II and III are plots of data taken on tests run in a larger pipe line which was many times longer than the test pipe line of curve I. Curve II shows that a 61% advantage was realized upon the addition of 0.4% water and an 83% advantage when the amount of water added to form the lubricating film was increased to 2.3%.

It was also found that higher advantages could be achieved with the addition of smaller amounts of lubricating water when minor amounts of a chemical were added to the water, since this would increase the water's ability to selectively adhere to the steel pipe and displace oil films therefrom without forming an emulsion. Phosphates and polyphosphates, for example, sodium hexametaphosphate and trisodium phosphate, were found to be especially effective. Only small amounts of these chemicals are needed, for example, from .05 to 3% by weight of the water being injected. Curve III indicates a 90% advantage when only 1% of water and hexametaphosphate was added.

In general all of the curves tend to level off above a point marked (o) and beyond this point there is only a small advantage gain with substantial increases in the amount of water injected into the pipe line. It has been found that under optimum operating conditions the thickness of the water lubricating film on the inner wall of the pipe line should be equal to or slightly greater than the inherent roughness of the inner wall of the pipe line. While for most systems the addition of from 0.5 to 1.0% of lubricating water is found to give excellent results, some systems may use as litle as 0.1% or as much as 5 or 6% water.

Lubrication properties of a water film injected according to the present invention are independent of the viscosity of the oil being pumped through the pipe line as long as the viscosity of the oil is substantially greater than that of the lubricating fluid. When the present invention is to be employed in long pipe lines of large diameter, it is highly desirable that the oil in the pipe line and the films of lubricating fluid have specific gravities of substantially the same value. The specific gravities of the two fluids can be substantially equalized by either making the water lighter or the oil heavier.

The oil may be made heavier by weighting it with materials such as iron ores, magnetite, etc., although the transportation of these materials in order to re-use them may be so costly that their use in certain regions would not be economically feasible. A less costly remedy is to reduce the specific gravity of the water in any suitable manner as by introducing into the water film small stable air bubbles.

This may be done by pre-treating the water supply with from 0.2 to 3% by weight of a water soluble salt which aids in the rapid nucleation of air bubbles and tends to prevent their coalescing after they are formed. Typical chemicals for this purpose which tend to reduce the surface tension of the water are water soluble salts of perfluorinated fatty acids, water soluble salts of siliconic acids and any of the ordinary detergents, such as the phosphates and carbonates, which do not cause the oil and water to emulsify.

The chemically-treated water is then saturated with air under pressure. Small air bubbles are created in the water by rapid pressure reduction of the saturated water as through a high-speed nozzle. Best results are obtained when the air bubbles are extremely minute. Preferably, the air bubbles which are generated are so small that the particle movement of the bubbles due to Brownian forces (i. e., diffusion forces) and to normal convection is far in excess of their movement due to gravity forces which cause the bubbles to rise. Hence, bubbles of the size in the range of $1/10$ of a micron are preferred. In addition to the use of air bubbles to reduce the specific gravity of the water, certain selected low gravity liquids, which are soluble in the low viscosity liquid film but not soluble in the crude oil, may be used.

While the present invention has been described as being applied to the transportation of viscous crude oil, it is realized that the method has other applications, such as for aiding the pumping of heavy fluids in chemical plants which are not soluble in or affected by water. However, in addition to using water as the lubricating fluid, other fluids may be used as long as they have a low viscosity, are essentially insoluble in or do not react with the viscous liquid being pumped, and have a specific gravity nearly equal to that of the viscous liquid.

We claim as our invention:

1. The method of transporting a viscous liquid through a pipe line, comprising the steps of continuously pumping a viscous liquid through the pipe line, injecting a thin lubricating film of a low viscosity liquid into the pipe line on the inner wall thereof, and extracting said low viscosity liquid film from said pipe line through the wall thereof at a point downstream of the injection point while flowing the main portion of the viscous liquid in an uninterrupted stream past said extraction point.

2. The method of transporting a viscous liquid through a pipe line having a plurality of pumping stations, said method comprising the steps of continuously pumping the viscous liquid from one station to another through the pipe line, injecting a thin lubricating film of a low viscosity liquid into the pipe line on the inner wall thereof downstream of each of the pumping stations, extracting said low viscosity liquid film from said pipe line on the upstream side of the next pumping station, and repeating the reinjection and re-extraction of the liquid film between each pair of pumping stations.

3. The method of transporting a viscous liquid through a pipe line, comprising the steps of continuously pumping a viscous liquid through the pipe line, injecting a thin lubricating film of a low viscosity liquid into the pipe line on the inner wall thereof, the direction of fluid injection being at an angle less than 90 degrees with the direction of flow, and extracting said low viscosity liquid film from said pipe line through the wall thereof at a point downstream of the injection point while flowing the main portion of the viscous liquid in an uninterrupted stream past said extraction point.

4. The method of transporting a viscous liquid through a pipe line, comprising the steps of continuously pumping a viscous liquid through the pipe line, injecting a thin lubricating film of a low viscosity liquid into the pipe line around the entire periphery and onto the inner wall thereof, and extracting said low viscosity liquid film from said pipe line through the wall and around the entire periphery thereof at a point downstream of the injection point while flowing the main portion of the viscous liquid in an uninterrupted stream past said extraction point.

5. Apparatus for lubricating a pipe line transporting a viscous liquid with a low viscosity liquid film injected into the pipe line between the viscous liquid and the inner wall of said pipe line, said apparatus comprising in combination with a pipe line for carrying the viscous liquid and at least one pump for pumping the viscous liquid, injection port means in said pipe line downstream of said pump for injecting a low viscosity liquid into said pipe line and around the inner wall thereof, extraction port means in the wall of said pipe line near the downstream end thereof for removing the low viscosity liquid film therefrom while the main portion of viscous liquid flows in an uninterrupted stream past said extraction port means, separator means for separating said viscous liquid from said low viscosity liquid, and conduit means in communication between said extraction port means and said separator means.

6. Apparatus for lubricating a pipe line transporting a viscous liquid with a low viscosity liquid film injected into the pipe line between the viscous liquid and the inner wall of said pipe line, said aparatus comprising in combination with a pipe line for carrying the viscous liquid, at least one pump for pumping the viscous liquid, injection port means in said pipe line downstream of said pump for injecting a low viscosity liquid into said pipe line and around the inner wall thereof, and extraction port means in the wall of said pipe line near the downstream end thereof for removing the low viscosity liquid film therefrom while the main portion of viscous liquid flows in an uninterrupted stream past said extraction port means, a jacket secured to the pipe line in a fluidtight manner over each of the injection port means and extraction port means, conduit means in communication between the jacket of the injection port means and a source of low viscosity fluid, a fluid separator, and conduit means in communication between the jacket of the extraction port means and the separator.

7. Apparatus for lubricating a pipe line transporting a viscous liquid with a low viscosity liquid film injected into the pipe line between the viscous liquid and the inner wall of said pipe line, said apparatus comprising in combination with a pipe line for carrying the viscous liquid and at least one pump for pumping the viscous liquid, injection port means in said pipe line downstream of said pump for injecting a low viscosity liquid into said pipe line and around the inner wall thereof, and extraction port means in said pipe line near the downstream end thereof for removing the low viscosity liquid film therefrom while the main portion of viscous liquid flows in an uninterrupted stream past said extraction port means, said injection port means comprising at least four ports through the wall of said pipe line spaced at substantially equidistances from each other around the periphery of the pipe line, the sum of the diameters of said ports being equal to at last 10 percent of the peripheral dimension of said pipe line.

8. The apparatus according to claim 5 wherein the injection and extraction port means each comprise a plurality of elongated slots through the wall of the pipe line arranged in a row around the periphery of the pipe line with the long dimension of the slots normal to the axis of the pipe line.

9. The apparatus according to claim 5 wherein the injection and extraction port means each comprise a continuous slot through the wall of the pipe line around the periphery thereof.

10. The apparatus according to claim 5 wherein the injection and extraction port means each comprise a continuous slot through the wall of the pipe line around the periphery thereof, said injection slot extending through the wall of said pipe line at an angle of less than 90 degrees with the direction of flow and the extraction slot extending through the wall at an angle of more than 90 degrees with the direction of flow.

11. The method of transporting a viscous liquid through a pipe line, comprising the steps of continuously pumping a viscous liquid through the pipe line, lowering the specific gravity of a low viscosity liquid to substantially that of the viscous liquid, injecting a thin lubricating film of the low viscosity liquid into the pipe line on the inner wall thereof, the direction of fluid injection being at an angle less than 90 degrees with the direction of flow, and extracting said low viscosity liquid film from said pipe line at a point downstream of the injection point.

12. The method of transporting a viscous liquid through a pipe line, comprising the steps of continuously pumping a viscous liquid through the pipe line, injecting air under pressure into a body of a low viscosity liquid, rapidly reducing the pressure of said body of liquid thereby generating minute air bubbles therein, injecting a thin lubricating film of the aerated low viscosity liquid into the pipe line on the inner wall thereof, and extracting said low viscosity liquid film from said pipe line at a point downstream of the injection point.

References Cited in the file of this patent

UNITED STATES PATENTS

| Number | Name | Date |
| --- | --- | --- |
| 759,374 | Isaacs et al. | May 10, 1904 |
| 808,782 | Speed | Jan. 2, 1906 |
| 1,192,438 | Looman | July 25, 1916 |
| 1,767,958 | Berg | June 24, 1930 |
| 2,104,519 | Hern | Jan. 4, 1938 |
| 2,170,247 | Lambert | Aug. 22, 1939 |
| 2,315,044 | Bransky | Mar. 30, 1943 |
| 2,533,878 | Clark | Dec. 12, 1950 |
| 2,673,648 | Kenney | Mar. 30, 1954 |